3,379,669
COMPOSITION OF SYNTHETIC THERMOPLASTIC RESINS COMPRISED OF VINYL CHLORIDE AND ESTERS OF ALIPHATIC PHTHALATE PLASTICIZERS
Fausto Bargellini, Porto Marghera, and Enzo Gagliardo, Peroga di Vegonza, Italy, assignors to Montecatini Edison S.p.A., Milan, Italy, a corporation of Italy
No Drawing. Filed Sept. 21, 1965, Ser. No. 489,072
Claims priority, application Italy, Sept. 28, 1964, 21,032/64
2 Claims. (Cl. 260—31.6)

ABSTRACT OF THE DISCLOSURE

A composition comprising a synthetic thermoplastic resin comprised of vinyl chloride and a plasticizer of the formula

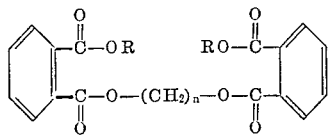

wherein R is a straight branched chain hydrocarbon of from 6 to 12 carbon atoms and $n$ is a whole number of from 2 to 10.

---

The present invention relates to compounds suitable for use as plasticizers for synthetic thermoplastic resins, and to a process for preparing same.

More particularly, this invention relates to plasticizing compounds for polymers and copolymers of vinylchloride, and which compounds are phthalic acid derivatives and have extremely low volatilities.

It has now become common practice in polymer chemistry to add plasticizers to synthetic resins in order to improve their physical and mechanical properties such as, inter alia, increased flexibility at low temperatures and reduce processing temperatures required by the polymeric materials.

One of the characteristics necessary for good plasticizers is a complete absence of volatility, or at least a volatility that is as low as possible.

In fact, it is evident that if a part of the plasticizer were to leave the resin, the characteristics thereof would be considerably altered, e.g., fragility and shrinkage would increase corresponding to the quantity of the plasticizer volatilized.

Among the most commonly used plasticizers, the phthalates such as dimethylphthalate, diethylphthalate, dibutylphthalate and dioctylphthalate are the drawback of being considerably volatile.

Those groups of polymeric plasticizers known in the art that have low volatilities are generally difficult to process.

Accordingly, it is an object of this invention to provide new plasticizing agents for plastic materials, especially for polyvinylchloride based compositions which agents have improved properties such as minimum loss due to volatility, easy workability and a high resistance to extraction by solvents.

Another object of this invention is to provide plasticized polymeric compounds, particularly polymers and copolymers of vinylchloride obtained by emulsion and suspension processes having high thermal stability and workability on industrial machinery, such compounds being particularly suited for the production of electrical cables capable of resisting high operational temperatures (105° C., according to Underwriters' Laboratories specifications) and for insulating materials capable of resisting the noxious action of humidity, such as gaskets for refrigerators.

These and other objects are attained according to the present invention by using as plasticizing agents for synthetic thermoplastic resins compounds of the following general formula:

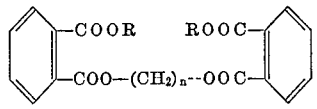

wherein R represents a radical derived from an aliphatic alcohol with a linear or branched chain having from between 6 and 12 carbon atoms and $n$ is a whole number between 2 and 10.

A particularly preferred embodiment is a compound according to the above formula wherein R represents a radical derived from isodecyl alcohol and $n$ equals 4.

The compounds of this invention may be prepared by esterifying phthalic anhydride with an aliphatic alcohol with a linear or branched chain having from between 6 and 12 carbon atoms and thence with a dichloroalkane of the general formula $Cl-(CH_2)_n-Cl$ wherein $n$ is a whole number between 2 and 10.

Particularly good results are obtained by using isodecyl alcohol and 1,4-dichlorobutane.

According to a preferred method for the preparation of the compounds of this invention, one starts with the monoesterification of the phthalic anhydride by reacting it with an alcohol belonging to the aforesaid class, at a temperature of between 90° and 115° C. and in a medium of the same alcohol used for the reaction.

The thus obtained acid monoester is transformed into the corresponding sodium salt by means of anhydrous $Na_2CO_3$ and after elimination of substantially all of the water by distillation the sodium salt is then reacted at 140°–150° C. with an approximately stoichiometric quantity of dichloroalkane in the presence of catalytic quantities of NaI and a tertiary amine.

Upon completion of the reaction, the mass obtained is subjected to washing in aqueous alkaline baths; excess alcohol is distilled away and the resultant product is filtered on fossil meal.

Some of the applications for which the plasticizers of this invention are susceptible comprise:

Electrical cables capable of resisting high operating temperatures, insulating materials that present a high resistance to the action of humidity, plastisols, coatings for automobile dashboards, the insides of tapestry and upholstery for cars, gaskets for refrigerators and other electrical household appliances, and linings for protective tarpaulins.

In order to determine the plasticizing characteristics of the compounds of the present invention, the following tests were carried out:

Measuring of volatility;
Measuring of exudation;
Resistance to extraction by solvents or reactants;
Determination of mechanical characteristics.

These tests were carried out on specimens prepared by mechanically mixing polyvinylchloride with plasticizer and stabilizers according to the method described, infra.

Into a mixer with helicoidal blades and a capacity of 5 litres, working at 66 r.p.m., were introduced the polyvinylchloride and the stabilizers; the mixture was maintained with stirring for 10 minutes at 60° C.; the plasticizer, after having been heated to 60° C., was introduced into the mixture; and the mass was stirred at a temperature of 90° C. for a time sufficient to obtain a perfectly dry product.

Gelling of the material was carried out by using a cylinder-mixer with cylinders of 205 mm. diameter (steam-heated) working at high speeds, the distance between the two cylinders being adjustable.

The mixture thus obtained was processed under the following conditions.

(A)—First operation:

| | |
|---|---|
| Speed of cylinders, forward ___rev./min__ | 24 |
| Speed of cylinders, rear _____rev./min__ | 20 |
| Distance between the cylinders _____mm__ | 0.3 |
| Processing time _____minutes__ | 5–7 |
| Temperature of the cylinders _____° C__ | 148–150 |

(B)—Second operation:

| | |
|---|---|
| Speed (same for both cylinders) rev./min__ | 24 |
| Distance between cylinders _____mm__ | 2.5 |
| Processing time _____minutes__ | 2 |
| Temperature on cylinders _____° C__ | 148–150 |

The thus obtained sheets were reduced to small plates by vertical pressing (Potvel press) at a temperature of 150° C., at a pressure of 50 atm., for a period of 3 minutes; and subsequently the plates were cooled to room temperature.

The single specimens for the measuring tests were then obtained from the small plates after seasoning for 7 days at 23° C., at a relative humidity of 50%.

Loss due to volatility

The determination of the loss due to volatility was carried out by putting the material, shaped into small discs of 5 cm. diameter and of 1±0.1 mm. thickness, between two layers of active carbon (particles of size about 10 mesh) and keeping same in an oven at 87° C. for periods of one, two and six days, respectively.

After a preliminary reconditioning at 23° C. and a relatively humidity of 50% for 24 hours, the loss in weight was established, expressing the results in the following manner:

$$\text{Percent age loss of Plasticizer} = \frac{W_1 - W_2}{W_1 \cdot A} \cdot 10^4$$

wherein
A=percent age of plasticized in the mixture at the start of the test,
$W_1$=initial weight of the test piece,
$W_2$=final weight of the test piece.

Measuring of exudation (Loop Test)

The determination of the exudation was carried out according to the Loop Test, by submitting the material under examination to a permanent stress. The eventual exudation was observed visually by superimposition of blotting paper upon the surface under test.

A test piece of 100 x 12 x 1 mm. size was folded in half and placed under pressure between two steel bars, so as to enable the folded part to protrude by 0.32 cm. from the edge.

Accordingly, a sort of loop was formed, inside which the behavior of the specimen thus prepared was observed after 24, 48, 168 hrs. of testing.

The results were expressed by graded attributes, for instance: no exudation, slight exudation or considerable exudation.

Resistance to extraction

The test for determining the extraction resistance to solvents or reactants was carried out by keeping the test pieces, consisting of small discs of 5 cm. diameter and 1 mm. thickness, submerged in a selected liquid at a temperature of 23° C. for 24 hours.

Before and after each submersion the materials were conditioned for 3 hours at 50° C. The results were expressed as percentage of plasticizer extracted with respect to the total quantity introduced into the compound. The formula used for such calculation is as follows:

$$\text{Extracted plasticizer (in percent)} = \frac{W_1 - W_2}{W_1 \cdot A} \cdot 10^4$$

wherein
A=percent age of plasticizer in the mixture,
$W_1$=weight of test piece before the test,
$W_2$=weight of test piece after the test.

Thermal stability

Determination of thermal stability was carried out by keeping the test materials in an oven fitted with a rotating specimen table at a temperature of 170° C. for a period of three hours and 20 minutes, with a frequency of extraction of the test pieces of 20 minutes.

The evaluation of the test results was expressed on the basis of the extraction number at which the first color change appeared corresponding to a barely visible degrading of the material and compared to the extraction numbers corresponding respectively to a degradation considered medium and maximum in comparison to a standard specimen suitably prepared for this purpose.

The average of the three values thus obtained was taken as the index of the degradation of the polyvinyl compound.

Measurement of mechanical characteristics

The mechanical properties were determined according to the ASTM–D–412 standards, with the aid of an "Instron" dynamometer operating at a traction speed equal to 500 mm./minute on conditioned test pieces.

To illustrate further the present invention and the advantages thereof, the following specific examples are given, it being understood that these are merely intended to be illustrative and not limitative.

EXAMPLE 1

Into a 10 l. flask fitted with a thermometer, stirrer and a condensing apparatus with a Dean Stark trap, was first introduced 4982 g. of isodecyl alcohol and then, at 60° C., 1555 g. of phthalic anhydride.

The monoesterification reaction was carried out at a temperature of from 90° C. to 115° C. for 75 minutes.

Thence was added 568 g. of 99.5% pure $Na_2CO_3$ at a temperature between 90° and 95° C.

The mixture was left to react at the above temperature for 60 minutes, whereupon a vacuum to a maximum of 100 mm. Hg was applied gradually, and then the mass was heated in a boiler to a maximum temperature of 125° C.

The alcohol which was thereby distilled was recycled and the $H_2O$ (86 g.) was removed.

Then, 5 g. of decolorizing carbon, 42.7 g. of triethylamine, 29 g. of NaI and 635 g. of 1,4-dichlorobutane (titre 99.3) were loaded simultaneously into the boiler.

The temperature was then rapidly raised to 145° C. and the mixture was left to react under constant strong stirring for 5 hours.

At the end of the reaction the mass was cooled to 90° C., subjected to washing with $H_2O$, and neutralized with an aqueous solution of 3% $Na_2CO_3$.

From the resulting organic phase the excess alcohol was separated by distillation under vacuum, first conducted in a current of $N_2$ and then in a steam current.

The boiler residue, which amounted to 3150 g. was filtered on diatomite and analyzed.

The main physical-chemical characteristics discovered in the product obtained were those recorded in Table 1.

TABLE 1

| | |
|---|---|
| Appearance | Clear. |
| Color, APHA[1] | Yellow (~250). |
| Smell | Slight. |
| Acidity (percent by weight as phthalic acid) | 0.019. |
| Moisture, percent | 0.020. |
| Refraction index at 20° C | 1.5050. |
| Specific weight at 20°/20° C | 1.045. |
| Viscosity at 20° C., cps. (centipoises) | 1650. |
| Stability (2 hr. at 180° C.): | |
|     Color APHA[1] after the test | Yellow (~500). |
|     Increase in acidity, percent | 0.022. |
|     Saponification number (Mg. KOH/g.) | 330.5. (Theoretical 336.5). |
| Chlorine ion | Absent. |

[1] American Public Health Association.

The product obtained was thereafter examined for its plasticizing properties after having been incorporated in a polyvinylchloride, and according to the herein-before described procedure.

The basic formulation was the following:

| | |
|---|---|
| PVC (of the type commercially known as Sicron 548[1]) | 100. |
| Plasticizer | 35, 50, 66 and 75 phr.[2] |
| Stabilizers of the commercially known type under the trade marks Mark WS/X[3] | 1.2. |
| Mark C[4] | 0.25. |

[1] Sicron 548: a PVC obtained by suspension polymerization and having a specific viscosity of 0.48.
[2] Phr.: parts per 100 parts of resin.
[3] Mark WS/X: Ba-Cd laurate+bisphenol A+glycols.
[4] Mark C: octyldiphenylphosphite+organic phosphites.

For volatility measurements the determinations were carried out after one, two and six days.

The values obtained are recorded in Table 2.

In the determination of thermal stability the value obtained for the "compounds" prepared either with 35 or with 50, 66 or 75 phr. is satisfactory in each case.

In the determination of the mechanical characteristics with respect to the plasticizer under examination, the following breaking loads were found:

TABLE 4

| Phr.: | Breaking load in kg./cm.$^2$ |
|---|---|
| 35 | 2.45 |
| 50 | 1.75 |
| 66 | 1.00 |
| 75 | 0.85 |

EXAMPLE 2

For comparison, a table with the values relating to the technological characteristics of the plasticizer of Example 1 and of the known di-2-ethyl-hexylphthalate are given:

TABLE 5

| Determinations | Type of plasticizer | |
|---|---|---|
| | Di-2-ethyl-hexyl-phthalate | Di-(isodecyl-o-phthalyl 1,4 butylenegly-colester |
| Volatility (percent of lost plasticizers; concentrated in mixture=75 phr.) | [1] 9.5 | [1] 1.8 / [2] 3.5 |
| Exudation after 168 hrs. (Loop Text) | None | None |
| Thermal stability (66 phr.) | Good | Good |
| Resistance to extraction (percent of extracted plasticizer: 75 phr. in the mixture) by Kerosene | 67 | 9.5 |

[1] After 48 hrs.
[2] After 144 hrs.

TABLE 2

| | Duration of Tests | | | | | | | | | | | |
|---|---|---|---|---|---|---|---|---|---|---|---|---|
| | 1 day | | | | 2 days | | | | 6 days | | | |
| Phr | 35 | 50 | 66 | 75 | 35 | 50 | 66 | 75 | 35 | 50 | 66 | 75 |
| Loss in weight percent of plasticized mixtures | 1.50 | 1.50 | 1.50 | 1.50 | 2.00 | 2.20 | 2.00 | 1.85 | 4.00 | 3.50 | 3.50 | 3.50 |

With regard to the exudation tests, the results obtained show that exudation of the plasticizer is practically non-existant.

For the resistance tests as regards the extraction action of solvents, those used were those normally used in this kind of test, and more precisely: kerosene, solution of sodium hydroxide at 5%, and soapy water (1% of Marseille soap).

As many variations of this invention may be made without departing from the spirit and scope thereof, it is to be understood that the invention is not limited to the specific embodiments thereof except as defined in the appended claims.

TABLE 3

| | Extracting materials | | | | | | | | | | | |
|---|---|---|---|---|---|---|---|---|---|---|---|---|
| | Kerosene | | | | 5+ solution of NaOH | | | | 1% emulsion of Marseille soap | | | |
| Phr | 35 | 50 | 66 | 75 | 35 | 50 | 66 | 75 | 35 | 50 | 66 | 75 |
| Percent age of extraction | 1.60 | 3.5 | 7.5 | 9.5 | 0.95 | 1.1 | 0.95 | 0.96 | 0.60 | 0.90 | 1.00 | 1.5 |

We claim:
1. A composition comprising a synthetic thermoplastic resin consisting essentially of vinyl chloride and a plasticizer of the formula

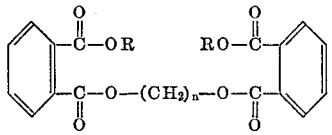

wherein R is a straight or branched chain hydrocarbon of from 6 to 12 carbon atoms and $n$ is a whole number of from 2 to 10.

2. A composition according to claim 1, wherein R is isodecyl and $n$ is 4.

References Cited
UNITED STATES PATENTS
2,015,077 9/1935 Lawson _____ 260—31.8
2,075,107 3/1937 Frazier _____ 260—31.6
2,607,799 9/1952 Weesner _____ 260—31.6

MORRIS LIEBMAN, *Primary Examiner.*
L. T. JACOBS, *Assistant Examiner.*